(12) United States Patent
De Mattia et al.

(10) Patent No.: US 8,985,995 B2
(45) Date of Patent: Mar. 24, 2015

(54) PROCESS FOR MANUFACTURING A STIFFENER OF COMPOSITE MATERIAL

(75) Inventors: Denis De Mattia, Basse Goulaine (FR); Olivier Guillemot, Saint-Crespin sur Moine (FR)

(73) Assignee: Airbus Operations (S.A.S.), Toulouse (FR)

( * ) Notice: Subject to any disclaimer, the term of this patent is extended or adjusted under 35 U.S.C. 154(b) by 819 days.

(21) Appl. No.: 13/253,300

(22) Filed: Oct. 5, 2011

(65) Prior Publication Data
US 2012/0086150 A1 Apr. 12, 2012

(30) Foreign Application Priority Data
Oct. 8, 2010 (FR) ...................... 10 58171

(51) Int. Cl.
| | | |
|---|---|---|
| B29C 53/04 | (2006.01) | |
| B29C 70/56 | (2006.01) | |
| B29C 70/32 | (2006.01) | |
| B29C 70/02 | (2006.01) | |
| B29C 53/80 | (2006.01) | |
| B29C 53/36 | (2006.01) | |
| B29C 53/56 | (2006.01) | |
| B29C 53/82 | (2006.01) | |

(Continued)

(52) U.S. Cl.
CPC ......... B29C 70/56 (2013.01); *B29C 2053/8033* (2013.01); *B29C 53/36* (2013.01); *B29C 2053/8025* (2013.01); *B29C 53/56* (2013.01); *B29C 53/821* (2013.01); *B29C 53/845* (2013.01); *B29C 53/8008* (2013.01); B29C 70/32 (2013.01); *B29L 2031/003* (2013.01); *Y02T 50/433* (2013.01); *Y02T 50/43* (2013.01)

USPC ........... 425/402; 425/111; 425/112; 425/403; 242/419; 242/443

(58) Field of Classification Search
USPC .......... 242/419, 449; 425/111, 112, 402, 403; 264/312
See application file for complete search history.

(56) References Cited

U.S. PATENT DOCUMENTS 4,938,824 A * 7/1990 Youngkeit ...................... 156/173
5,779,838 A * 7/1998 Fellers et al. .................. 156/195

(Continued)

FOREIGN PATENT DOCUMENTS

| EP | 1 211 052 | 6/2002 |
| GB | 2 467 417 | 8/2010 |

(Continued)

OTHER PUBLICATIONS

French Search Report dated Apr. 15, 2011, corresponding to Priority Application No. FR 1058171.

*Primary Examiner* — Atul P. Khare
(74) *Attorney, Agent, or Firm* — Young & Thompson

(57) ABSTRACT

A process for manufacturing a stiffener made of composite material with an inside surface of a concave shape, includes producing a flat strip (18) that includes at least one layer of fibers; heating it to be able to deform it; connecting one of the lateral edges of the strip (18) to a rotary mandrel (36) in such a way as to cause a winding of the strip on the mandrel (36) during its rotation, whereby the mandrel (36) has an outside surface (46) of which at least one part corresponds to the inside surface of the stiffener to be produced; and exerting tension at the other lateral edge of the strip (18) in a direction that is opposite to the direction of the movement of the strip (18) caused by the winding on the rotary mandrel (36).

10 Claims, 4 Drawing Sheets

(51) Int. Cl.
*B29C 53/84* (2006.01)
*B29L 31/00* (2006.01)

(56) References Cited

U.S. PATENT DOCUMENTS

| | | | | |
|---|---|---|---|---|
| 5,882,462 A | * | 3/1999 | Donecker et al. | 156/205 |
| 5,954,917 A | * | 9/1999 | Jackson et al. | 156/433 |
| 6,045,876 A | * | 4/2000 | Fellers et al. | 427/434.4 |
| 7,820,092 B2 | * | 10/2010 | Benson et al. | 264/258 |
| 7,943,076 B1 | | 5/2011 | Hawkins et al. | |
| 2004/0074587 A1 | * | 4/2004 | Koerwien et al. | 156/93 |
| 2005/0238892 A1 | * | 10/2005 | Evans | 428/458 |
| 2008/0283177 A1 | | 11/2008 | Glain et al. | |
| 2009/0294566 A1 | * | 12/2009 | Witmer et al. | 242/410 |
| 2009/0294567 A1 | * | 12/2009 | Witmer et al. | 242/419 |

FOREIGN PATENT DOCUMENTS

| | | |
|---|---|---|
| WO | 2008/070621 | 6/2008 |
| WO | 2009/118695 | 10/2009 |

* cited by examiner

PROCESS FOR MANUFACTURING A STIFFENER OF COMPOSITE MATERIAL

BACKGROUND OF THE INVENTION

1 Field of the Invention

This invention relates to a process for manufacturing a stiffener made of composite material with an inside surface of a concave shape.

2 Description of the Related Art

In the field of aeronautics, stiffeners that are called stringers, connected to the inside surface of a wall of an aircraft fuselage, are known. On the geometric plane, this type of stiffener 10' can have a U-shaped cross-section as illustrated in FIG. 1A. According to another aspect, these stiffeners can comprise discontinuities over their lengths, for example slopes on the order of 10% over several millimeters in particular because of other reinforcements that are present on the skin of the fuselage.

These U-shaped stiffeners can also be present at the level of other parts of the aircraft, such as the center wing section that connects the fuselage to the wing. The center section can comprise other types of stiffeners, as illustrated in FIG. 1B, at the junction zone of two adjacent panels that form said section.

According to one embodiment, this type of stiffener 10 comprises primary wings 12 and 12' that form an angle of approximately 90° and secondary wings 14 and 14', each connected to one of the primary wings 12 or 12' and arranged approximately at 90° relative to this wing. These secondary wings 14 and 14' have ends that are oriented toward one another although the distance that separates the ends of the secondary wings is less than that separating the edges 16, 16' that connect the primary wings 12, 12' to the secondary wings 14, 14'. The junction zones between the primary wings, on the one hand, and the primary wings and the secondary wings, on the other hand, can be more or less rounded.

In the case of a center section, the primary wings 12 and 12' are flattened against the adjacent walls of the center section, and the secondary wings are flattened against the wings of the adjacent U-shaped stiffeners.

According to a first operating mode by press stamping, the stiffener is produced between a mold (or punch) and a counter-mold (or matrix).

In advance, layers and/or folds of fibers that are pre-impregnated with resin are draped flat, with the fibers being oriented correctly based in particular with respect to the stresses that will be applied to the stiffener. Next, strips are cut based on the dimensions of the stiffeners. For each stiffener, the corresponding strip is heated to a temperature on the order of 80° C. and then deposited between the mold and the counter-mold that are mounted on a heating press. The mold and the counter-mold are then closed in such a way as to form the stiffener. After a hot compacting phase whose purpose is to produce, on the one hand, an optimum degassing of the preform without drawing in the product that can form the matrix, and, on the other hand, a contraction of the preform, the mold and the counter-mold are open in such a way as to extract the stiffener that is formed.

This approach can make it possible to obtain partially polymerized stiffeners and to terminate the polymerization after the application of stiffeners on the skin to be reinforced in such a way as to obtain a connection by co-curing between said stiffeners and said skin.

This operating mode is not suitable for obtaining stiffeners with closed cross-sections, as illustrated in FIG. 1B, because in this case, the punch or the matrix is to be produced in several parts that move relative to one another to obtain this type of profile. The fact that the punch or the matrix is produced in several parts leads to complicating the piece of equipment, generally making it more fragile, and it does not ensure the absence of folding of the layers.

According to another operating mode by thermoforming, in a first step, a flat blank is produced by draping layers and/or pre-impregnated fibers of a resin, with the fibers being oriented correctly in particular with respect to the stresses that will be applied to the stiffener.

This flat blank is next placed on a punch-type piece of equipment and then heated to a temperature on the order of 80° C. in such a way as to make it deformable and to make possible the sliding of fiber layers relative to one another by preventing folding. To flatten the blank against the punch, a bladder is used that is connected in an airtight manner to the punch on the periphery of the blank to be deformed. Next, a partial vacuum is produced in the space that is delimited by the punch and the bladder in such a way as to flatten the bladder and therefore the blank against the punch.

The unit is next cooled to set the shape of the stiffener before the bladder is removed.

As above, this operating mode is not satisfactory for producing stiffeners with closed cross-sections, because it does not ensure a sliding of layers relative to one another over the entire established length of the primary and secondary wings although folds can appear, more particularly at junction zones of the wings.

Consequently, regardless of the operating mode, folds can be created during the shaping of the stiffener, whereby these folds constitute structural defects that alter the mechanical characteristics of the thus obtained stiffener.

BRIEF SUMMARY OF THE INVENTION

Also, the purpose of this invention is to remedy the drawbacks of the prior art by proposing a process for manufacturing a stiffener that is made of composite material that limits the risk of folds appearing during its shaping.

For this purpose, the invention has as its object a process for manufacturing a stiffener made of composite material with an inside surface of a concave shape, whereby said process consists in producing a flat strip that comprises at least one layer of fibers, in heating it to be able to deform it, characterized in that it consists in connecting one of the lateral edges of the strip to a rotary mandrel in such a way as to cause a winding of the strip on said mandrel during its rotation, whereby said mandrel has an outside surface of which at least one part corresponds to the inside surface of the stiffener to be produced, and in exerting tension at the other lateral edge of the strip in a direction that is opposite to the direction of the movement of the strip caused by the winding on the rotary mandrel.

BRIEF DESCRIPTION OF THE DRAWINGS

Other characteristics and advantages will emerge from the following description of the invention, a description that is given only by way of example, relative to the accompanying drawings in which.

DETAILED DESCRIPTION OF THE PREFERRED EMBODIMENTS

Figure 1A:
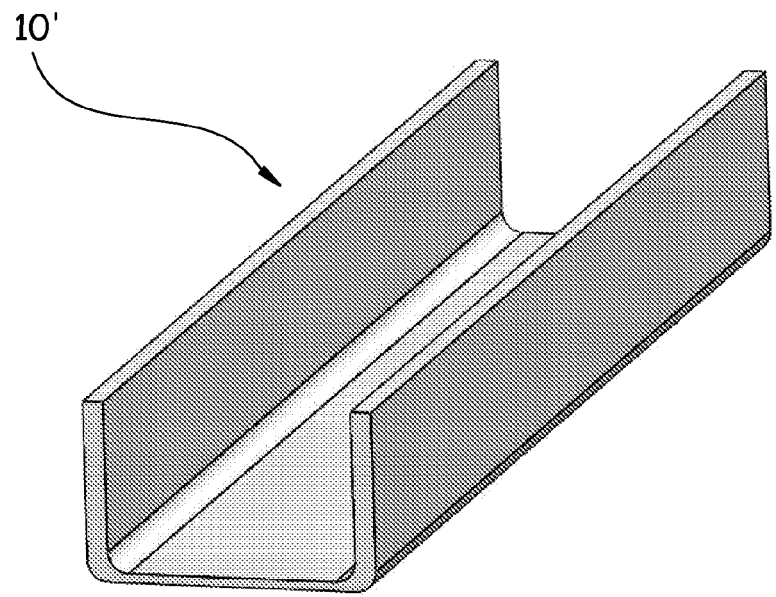
FIG. 1A is a perspective view of a first example of a stiffener with a U-shaped cross-section.
Figure 1B:
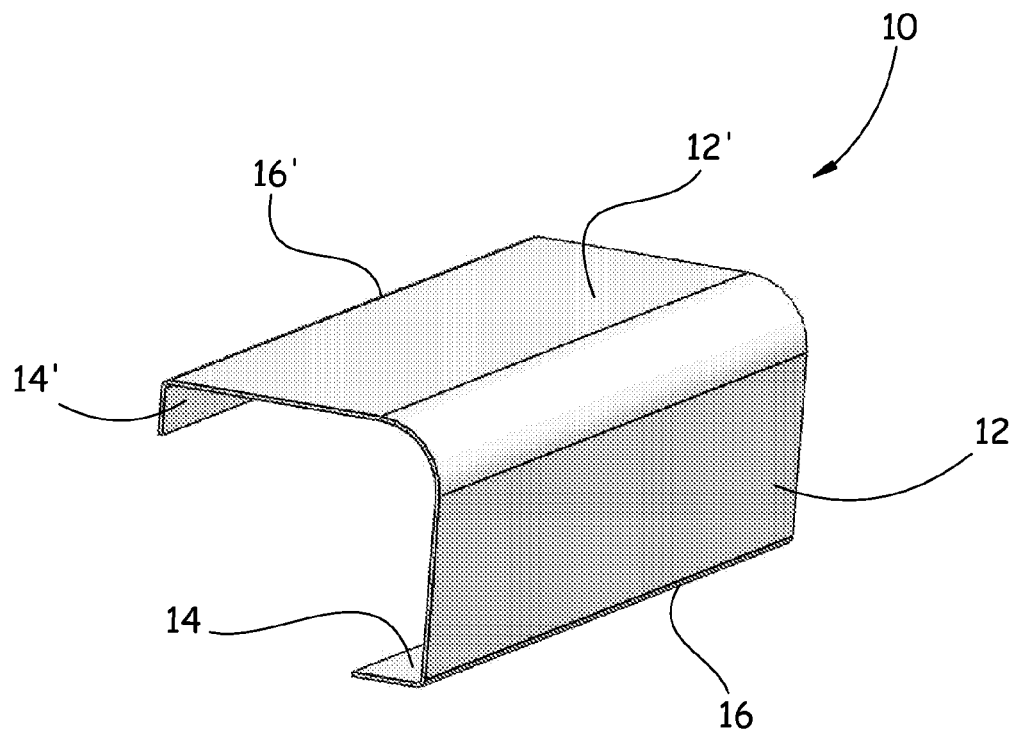
FIG. 1B is a perspective view of another example of a stiffener with a closed cross-section.

In FIG. 1B, a stiffener with a closed-type cross-section is shown. Closed cross-section is defined as a stiffener whose ends of the wings are spaced by a distance that is less than the maximum distance between the two wings. Although described as applied to this type of stiffener, the invention can apply to other forms of stiffeners, with a U-shaped, V-shaped or other cross-section, for example.

Hereinafter, longitudinal direction is defined as the direction that corresponds to the length of the stiffener. Transverse direction is defined as a direction that is perpendicular to the longitudinal direction.

The inside surface of the stiffener corresponds to the surfaces of wings oriented toward the other wings and therefore to the surface of a concave shape of the stiffener.

The stiffener comprises at least one fold or one layer of pre-impregnated fibers. The nature of the fibers and the resin can vary based on desired characteristics.

According to one operating mode, a flat draping of different folds necessary to obtaining the stiffener is carried out. This deposition of different folds can be done automatically using a draping machine.

This operating mode makes it possible to orient the fibers in specified directions. Likewise, this solution makes it possible to vary the number of folds over the length of the stiffener in such a way as to obtain, for example, reinforced zones.

Advantageously, a stacking of the different folds is carried out, and then strips are cut, each strip corresponding to a stiffener.

Figure 2:
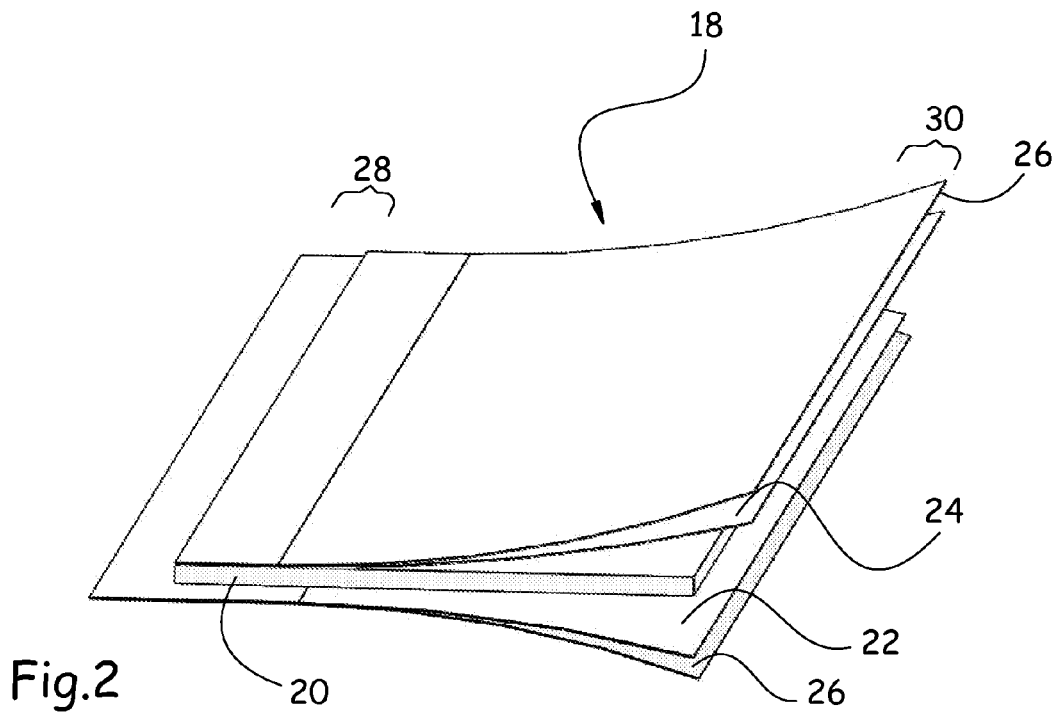
FIG. 2 is a perspective view of a flat blank made of composite material according to the invention before its being deformed.

FIG. 2 shows a strip 18 that is used for obtaining a stiffener 10. This strip has a length that is slightly greater than that of the finished stiffener and has a width that is slightly greater than the established width of the finished stiffener. The thickness of the strip can vary from one point to the next.

According to one embodiment, this strip 18 comprises at least one layer of carbon fibers 20.

The strip 18 comprises a glass fiber layer 22 that is called the lower layer at the lower surface and advantageously a glass fiber layer 24 at the upper surface that is called the upper layer 24.

As illustrated in FIG. 2, the lower layer 22 has a greater width than that of the carbon fiber layer(s) 20 in such a way as to extend beyond said layers 20 at each end, for a reason that will be explained later. In parallel, the upper layer 24 has a width that is greater than that of the carbon fiber layer(s) 20 or is arranged relative to the carbon fiber layer(s) 20 in such a way as to extend beyond said layers 20 at at least one end.

Advantageously, the layers 22 and 24 have a length that is greater than that of the carbon fiber layer(s) 20 in such a way as to extend beyond said layers 20 at each end.

Advantageously, the strip 18 comprises plastic protective films 26 on its upper and lower surfaces.

Hereinafter, a lateral edge of the strip is defined as an edge of the strip that corresponds to the end of one of the wings of the stiffener. The strip 18 therefore comprises two lateral edges, a left lateral edge 28 and a right lateral edge 30.

Figure 3:
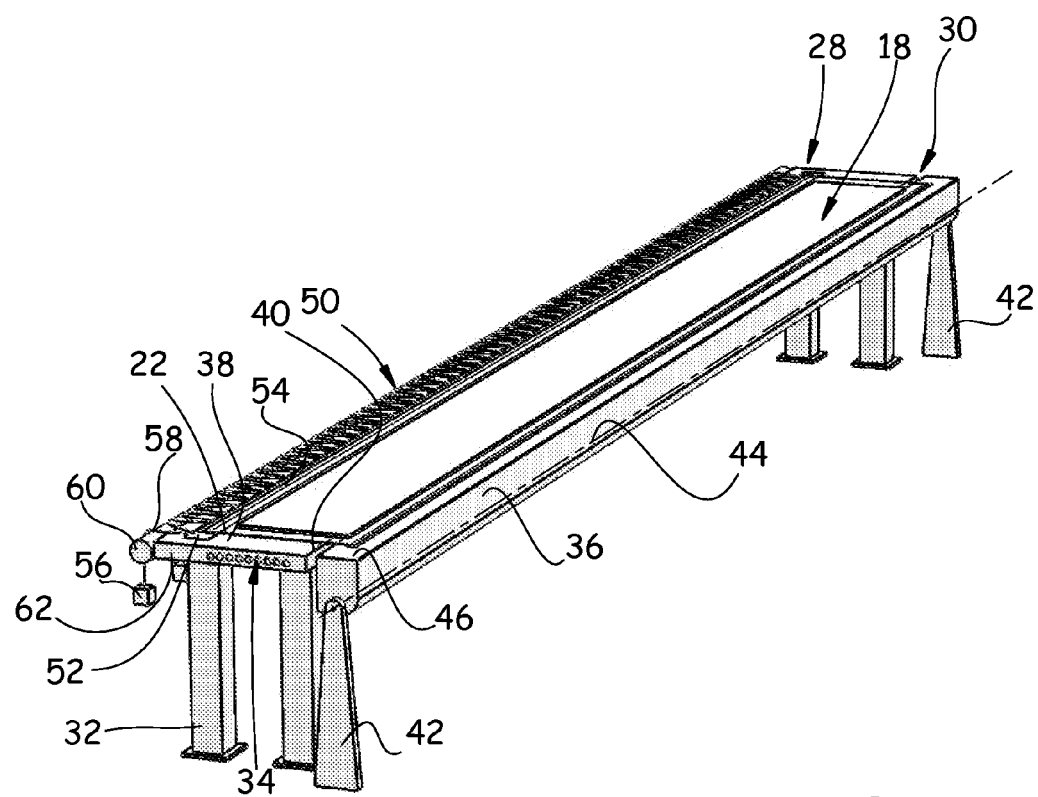
FIG. 3 is a perspective view of a piece of equipment that makes it possible to produce a stiffener according to the invention, during the installation of a flat blank.
Figure 4:
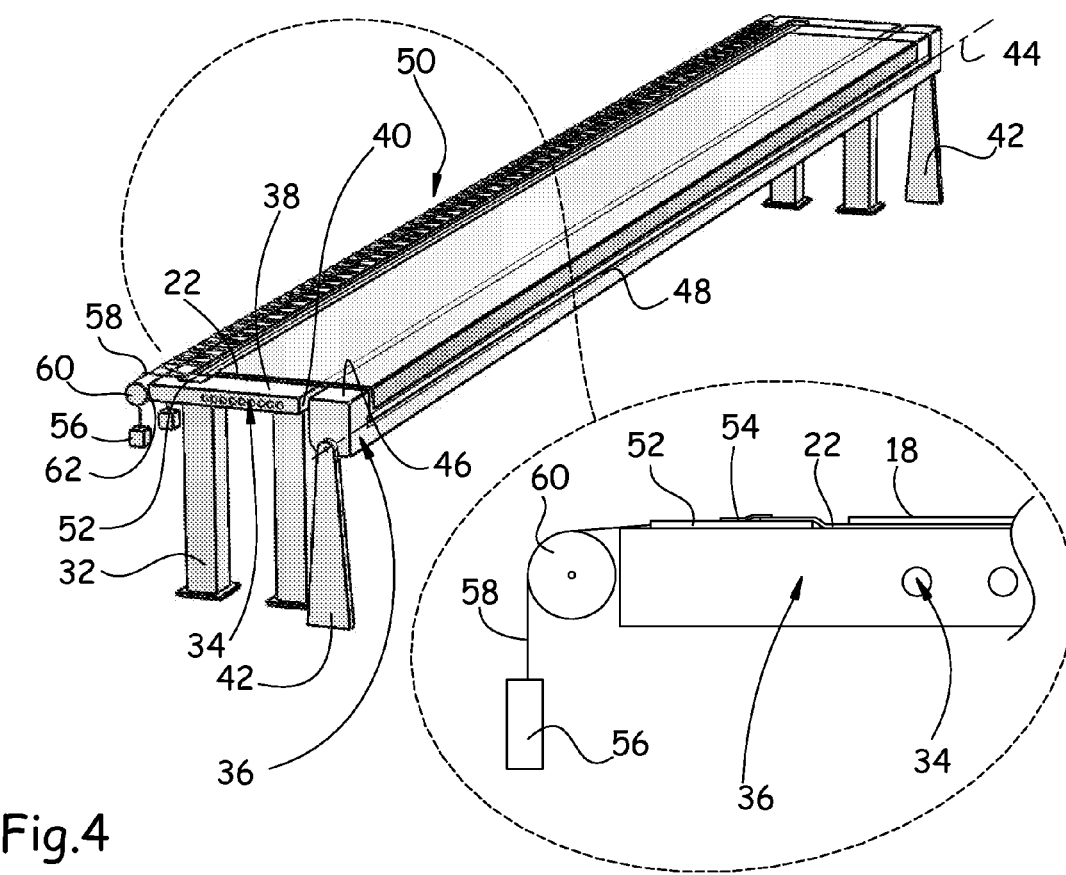
FIG. 4 is a perspective view of the piece of equipment of FIG. 3 during the shaping of the blank for producing a stiffener according to the invention.

To shape the strip 18, a piece of equipment is used as illustrated in FIGS. 3 and 4 comprising a frame 32 that ensures the function of a frame of reference, heating means 34 for carrying the strip 18 to a suitable temperature for its being deformed, a rotary mandrel 36, one of the lateral edges of the strip 18 being connected to the mandrel in such a way as to cause a winding of the strip over the mandrel during its rotation, with the other lateral edge of the strip being connected to a tension system in a direction that is opposite to the direction of the movement of the strip that is caused by the winding over the rotary mandrel.

According to one embodiment, the frame 32 comes in the form of a table with an upper surface 38, preferably horizontal, rectangular with suitable dimensions so that the strip 18 rests totally on said surface 38.

As appropriate, this table 32 can comprise heating means 34 in the form of resistors integrated in the table and arranged under the upper surface close to the edge 40 of the table that is parallel and close to the right lateral edge 30 of the strip 18.

The mandrel 36 is carried by a support 42 in the form of two spaced feet supporting a pivoting shaft 44 of the mandrel. The mandrel is arranged close to the edge 40 of the table and essentially parallel to said edge 40 and to the right lateral edge 30 of the strip. The mandrel 36 can be connected to the support 42 in a removable way. It has an outside surface 46 of which one part corresponds to the inside surface of the stiffener to be obtained.

The piece of equipment comprises means 48 for connecting the right lateral edge 30 of the strip to the mandrel, for example in the form of a strip of adhesive tape.

According to one variant, only the lower layer 22 with glass fibers is connected to the mandrel by the means 48 at its right lateral edge. As a variant, only the lower layer 22 and the upper layer 24 are connected to the mandrel by the means 48 at their right lateral edges.

Advantageously, means are provided for positioning the right lateral edge 30 of the strip at the mandrel 36 so that after the mandrel is pivoted, the strip is deformed according to the desired profile.

The mandrel is preferably not heated or heated to a temperature that is less than the temperature for forming the strip in such a way as to set the shape of the cross-section of the stiffener by absorption of the calories of the strip.

The mandrel will preferably be metal to ensure this heat dissipator function.

Advantageously, the mandrel can comprise several parts and can be of a "key" type in such a way as to allow the demolding of the stiffener after its cooling.

According to another characteristic of the invention, the piece of equipment comprises means 50 for exerting tension with a transverse resultant on the strip 18 as it is being deformed. These tension means 50 are to ensure a homogeneous tension over the entire length of the strip.

According to one embodiment, the left lateral edge 28 of the strip is connected to a tension strip 52 by any suitable means, such as, for example, a strip of adhesive tape 54. Advantageously, only the lower layer 24 is connected to the tension strip 52. This tension strip 52 is connected to the tension system 50.

According to one embodiment that is illustrated in FIGS. 3 and 4, the tension means 50 come in the form of a series of counterweights 56 connected to the tension strip 52 and distributed in a homogeneous manner over the entire length of said strip. These weights are connected by cables 58 to the tension strip 50. The tension system also comprises a roller 60 (or a pulley for each cable) arranged at the lateral edge 62 of the table that is opposite to the edge 40 and that supports the cables 58 in such a way as to suspend the counterweights 56.

The tension means 50 are not limited to the embodiment presented. Other approaches could be considered.

Advantageously, the piece of equipment can comprise an upper plate (not shown) that is arranged parallel to the table 32 above the latter for ensuring a compacting and the heating of the strip 18.

Figure 5A:
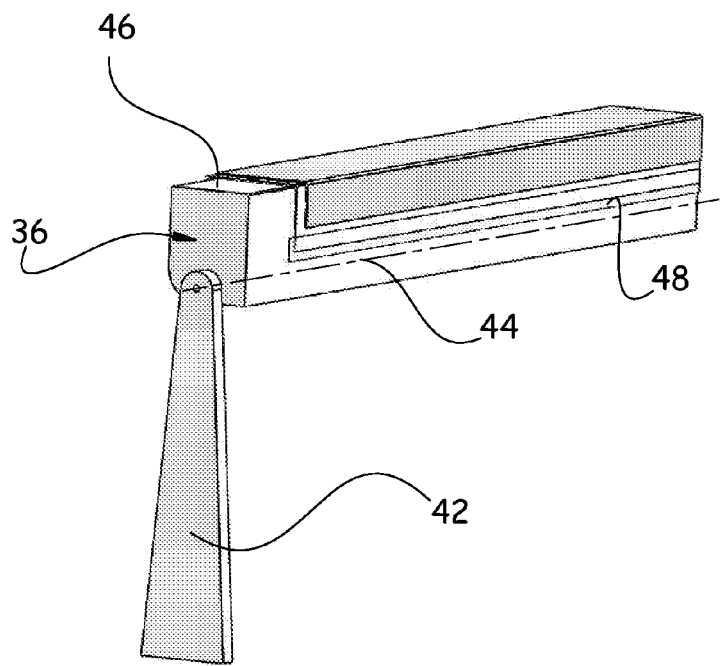
FIG. 5A is a perspective view of a part of the piece of equipment of FIG. 3 according to a first variant for producing a stiffener with a first profile.
Figure 5B:
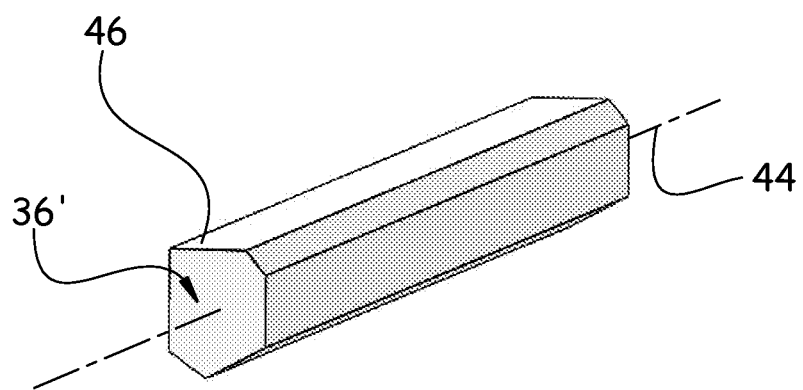
FIG. 5B is a perspective view of a part of the piece of equipment of FIG. 3 according to another variant for producing a stiffener with another profile.

Advantageously, the piece of equipment comprises at least two parts, one of them comprising the mandrel 36 and being connected to the rest of the piece of equipment in a removable manner. Thus, it is possible to adapt the piece of equipment quickly and in an economical manner based on the stiffener to be produced, with the shape of the mandrel being adapted to the profile of the stiffener that it is desired to obtain. Thus, this second part can comprise the support 42 and the mandrel 36, or only the mandrel 36. FIG. 5A shows a mandrel 36 for producing a stiffener as illustrated in FIG. 1B, and FIG. 5B shows a mandrel 36' for producing a stiffener with six sections, of which the section is shown in FIG. 5B. With another mandrel, it would be possible to obtain a stiffener 10' with a U-shaped cross-section as illustrated in FIG. 1A.

The operating mode of the piece of equipment is now described relative to FIGS. 3 and 4.

A strip 18 with its lower layer 22 and its upper layer 24 is connected to the table 32. The right lateral edge 40 of the lower layer 22 is connected to the mandrel 36 using an adhesive tape 48 that extends over the entire length of the right lateral edge.

Next, the tension system 50 is connected to the left lateral edge of the lower layer 22.

Advantageously, it is possible to use the upper plate for compacting the strip 18 and for bringing it to a temperature on the order of 80°.

When the temperature is reached, the upper plate can be removed.

The mandrel 36 is put into rotation in such a way as to cause the winding of the strip 18 over the mandrel 36. The latter pulls on the strip by means of the lower layer 22, which is subjected to tension using the tension system 50. This tensile force that is undergone by the lower layer 22 is transmitted to the carbon layer that is located just above and that itself transmits to the layer arranged just above it and so on to the upper layer 24. Thus, all of the layers are subjected individually to a tensile force and slide relative to one another without a risk of folding.

This operating mode ensures that the structure of the stiffener is sound over its entire thickness and more particularly at radii of curvature. Advantageously, the right lateral edge of the upper layer 24 can also be connected to the mandrel 36. This arrangement makes it possible to obtain an alignment of the right lateral edges of the different carbon layers and to shift the sliding at the left lateral edges of the carbon layers that have a stairway-type arrangement.

Upon contact with the mandrel 36, the strip 18 that is formed is set in particular in its thickness, which prevents the phenomena of re-swelling the carbon.

After shaping the stiffener, it is detached from the tension system 50, and the mandrel can be detached from its support in such a way as to transport the stiffener to the next station.

The invention claimed is:

1. A device for manufacturing a composite material stiffener having an inside concave surface from a flat strip comprising at least one layer of fibers, the device comprising:
    a table on which the flat strip rests across, the table comprising a means for heating the strip;
    a rotary mandrel arranged close and parallel to an edge of the table and having an outside surface of which at least one part corresponds to an inside surface of the stiffener to be produced;
    a means for connecting a first lateral edge of the strip to the rotary mandrel so as to cause winding and deforming of the strip on the mandrel during rotation of the mandrel; and
    a means for exerting tension at a second lateral edge of the strip in a direction opposite to a movement direction of the strip caused by said winding on the rotary mandrel, the means for exerting tension extending along the second lateral edge of the strip at an edge of the table opposite to the mandrel,
    wherein said device is operable for manufacturing the stiffener by steps of:
        heating the strip by the heating means;
        connecting the first lateral edge of the strip to the rotary mandrel; and
        rotating the mandrel so as to cause said winding and deforming of the strip on the mandrel while exerting said tension at the second lateral edge of the strip.

2. The device of claim 1, wherein the table has an upper rectangular surface with dimensions permitting the strip to rest entirely thereon.

3. The device of claim 1, wherein the heating means is in the form of resistors integrated in the table and arranged under an upper surface thereof.

4. The device of claim 1, wherein the mandrel is connected to the device in a removable manner.

5. The device of claim 1, wherein the mandrel comprises several parts allowing demolding of the stiffener.

6. The device of claim 1, wherein the mandrel is carried by a support in the form of two spaced feet supporting a pivoting shaft of the mandrel.

7. The device of claim 1, further comprising an upper plate for compacting the strip prior to said deforming.

8. The device of claim 1, wherein the means for exerting tension comprises a tension system having a series of counterweights connected to a tension strip which is further connected to the second lateral edge of the flat strip so as to distribute said tension in a homogenous manner over an entire length of the flat strip.

9. The device of claim 8, wherein the counterweights are connected by cables to the tension strip.

10. The device of claim 8, wherein the tension strip is connected to the second lateral edge of the flat strip by an adhesive strip.

* * * * *